(12) United States Patent
Hatanaka et al.

(10) Patent No.: US 12,233,680 B2
(45) Date of Patent: Feb. 25, 2025

(54) SUSPENSION AND OFF-ROAD VEHICLE

(71) Applicant: Kawasaki Motors, Ltd., Hyogo (JP)

(72) Inventors: Tatsuya Hatanaka, Akashi (JP); Takashi Hisamura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/089,630

(22) Filed: Dec. 28, 2022

(65) Prior Publication Data
US 2024/0217287 A1 Jul. 4, 2024

(51) Int. Cl.
*B60G 3/20* (2006.01)
*B60G 7/00* (2006.01)
*B60G 7/02* (2006.01)
B62D 7/18 (2006.01)

(52) U.S. Cl.
CPC .............. *B60G 3/20* (2013.01); *B60G 7/008* (2013.01); *B60G 7/02* (2013.01); *B60G 2200/1442* (2013.01); *B60G 2204/143* (2013.01); *B60G 2204/148* (2013.01); *B60G 2206/124* (2013.01); *B60G 2300/07* (2013.01); *B62D 7/18* (2013.01)

(58) Field of Classification Search
CPC . B60G 3/20; B60G 7/008; B60G 7/02; B60G 2200/1442; B60G 2204/143; B60G 2204/148; B60G 2206/124; B60G 2300/07; B62D 7/18
See application file for complete search history.

(56) References Cited

U.S. PATENT DOCUMENTS

| | | | | |
|---|---|---|---|---|
| 2,761,696 A | * | 9/1956 | Brown | B60G 3/20 267/221 |
| 11,104,384 B2 | | 8/2021 | Kinsman et al. | |
| 2007/0170682 A1 | * | 7/2007 | Kinugasa | B60G 3/20 280/124.135 |
| 2009/0160153 A1 | * | 6/2009 | Kunert | B60G 3/20 280/124.138 |
| 2014/0103627 A1 | * | 4/2014 | Deckard | B60R 22/00 411/362 |
| 2015/0061275 A1 | * | 3/2015 | Deckard | B62D 21/183 280/124.135 |
| 2016/0089945 A1 | * | 3/2016 | Kuwabara | B60G 7/001 280/124.117 |
| 2018/0215220 A1 | * | 8/2018 | Mailhot | B60G 3/20 |

FOREIGN PATENT DOCUMENTS

EP 2958792 B1 * 4/2021 ............. B60G 13/00

* cited by examiner

*Primary Examiner* — Jason D Shanske
*Assistant Examiner* — Matthew James O'Neill
(74) *Attorney, Agent, or Firm* — XSENSUS LLP

(57) ABSTRACT

A suspension 4 includes a suspension arm 41 that couples a knuckle 3 to a vehicle body frame 1 and swings relative to the vehicle body frame 1. The suspension arm 41 has a curve 8 to avoid contact with other components. The curve 8 is positioned closer to the vehicle body frame 1 with respect to the center of the suspension arm 41 in a longitudinal direction thereof.

17 Claims, 10 Drawing Sheets

SUSPENSION AND OFF-ROAD VEHICLE

FIELD

The technique disclosed herein relates to a suspension and an off-road vehicle.

BACKGROUND

U.S. patent Ser. No. 11/104,384 discloses a suspension including a suspension arm. The suspension arm includes a lower arm and an upper arm located higher than the lower arm.

SUMMARY

The suspension arm may swing up and down, and for this reason, there is a probability of the suspension arm contacting other components. If a sufficient space is ensured between the suspension arm and the other components to avoid contact, it is difficult to compactly locate the suspension.

The technique disclosed herein has been made in view of the above-described point, and an object thereof is to compactly locate a suspension while contact with other components is avoided.

A suspension disclosed herein includes a suspension arm that couples a knuckle to a vehicle body frame and swings relative to the vehicle body frame. The suspension arm has a curve to avoid contact with other components, and the curve is positioned closer to the vehicle body frame with respect to the center of the suspension arm in a longitudinal direction thereof.

An off-road vehicle disclosed herein includes a vehicle body frame, a front wheel, a knuckle that supports the front wheel, and a suspension that couples the knuckle to the vehicle body frame. The suspension has a suspension arm that couples the knuckle to the vehicle body frame and swings relative to the vehicle body frame. The suspension arm has a curve to avoid contact with other components. The curve is positioned closer to the vehicle body frame with respect to the center of the suspension arm in a longitudinal direction thereof.

The suspension can be compactly located while contact with the other components is avoided.

For the off-road vehicle, the suspension can be compactly located while contact with the other components is avoided.

DESCRIPTION OF EMBODIMENTS

Figure 1:
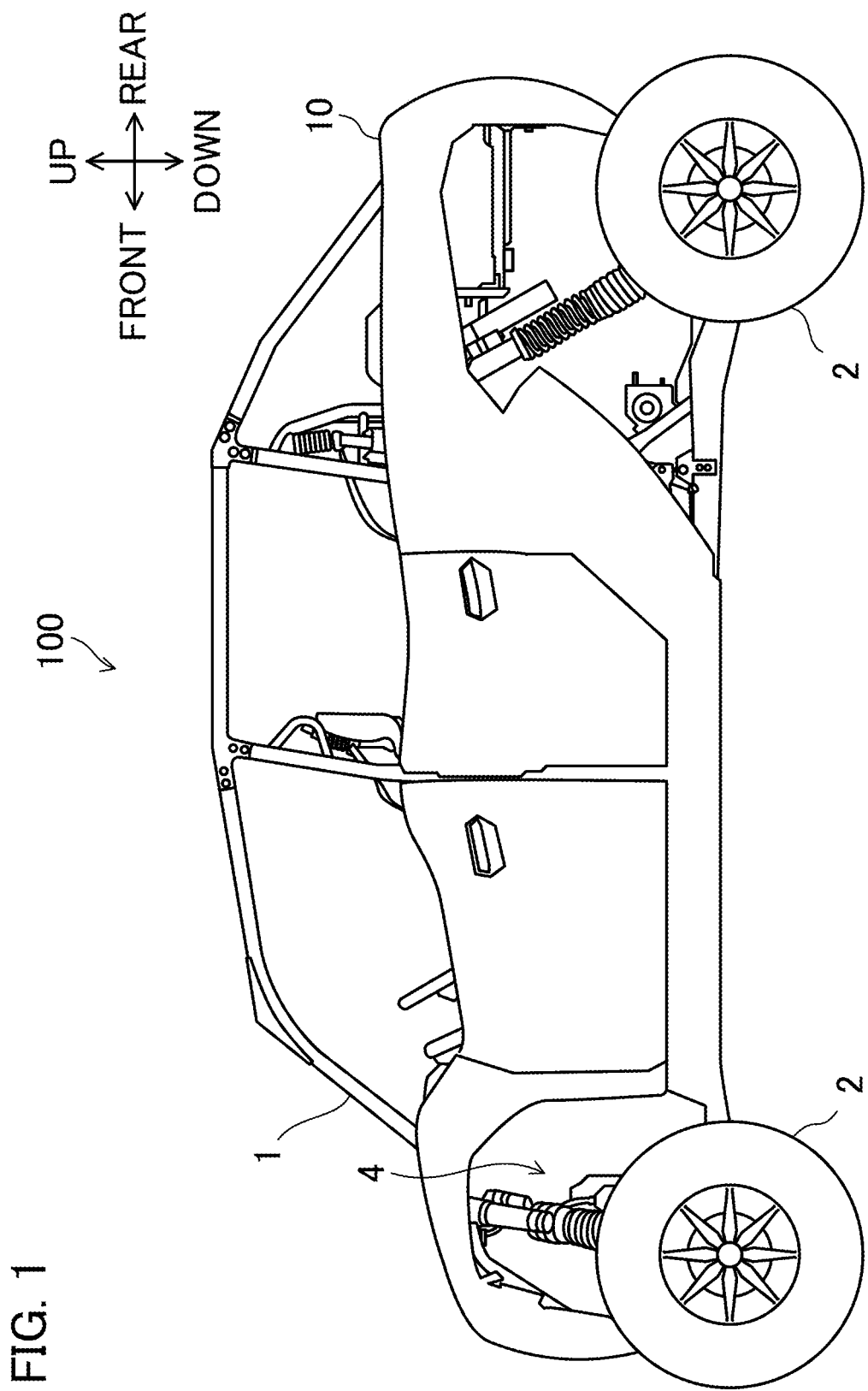
FIG. 1 is a side view of a utility vehicle.
Figure 2:
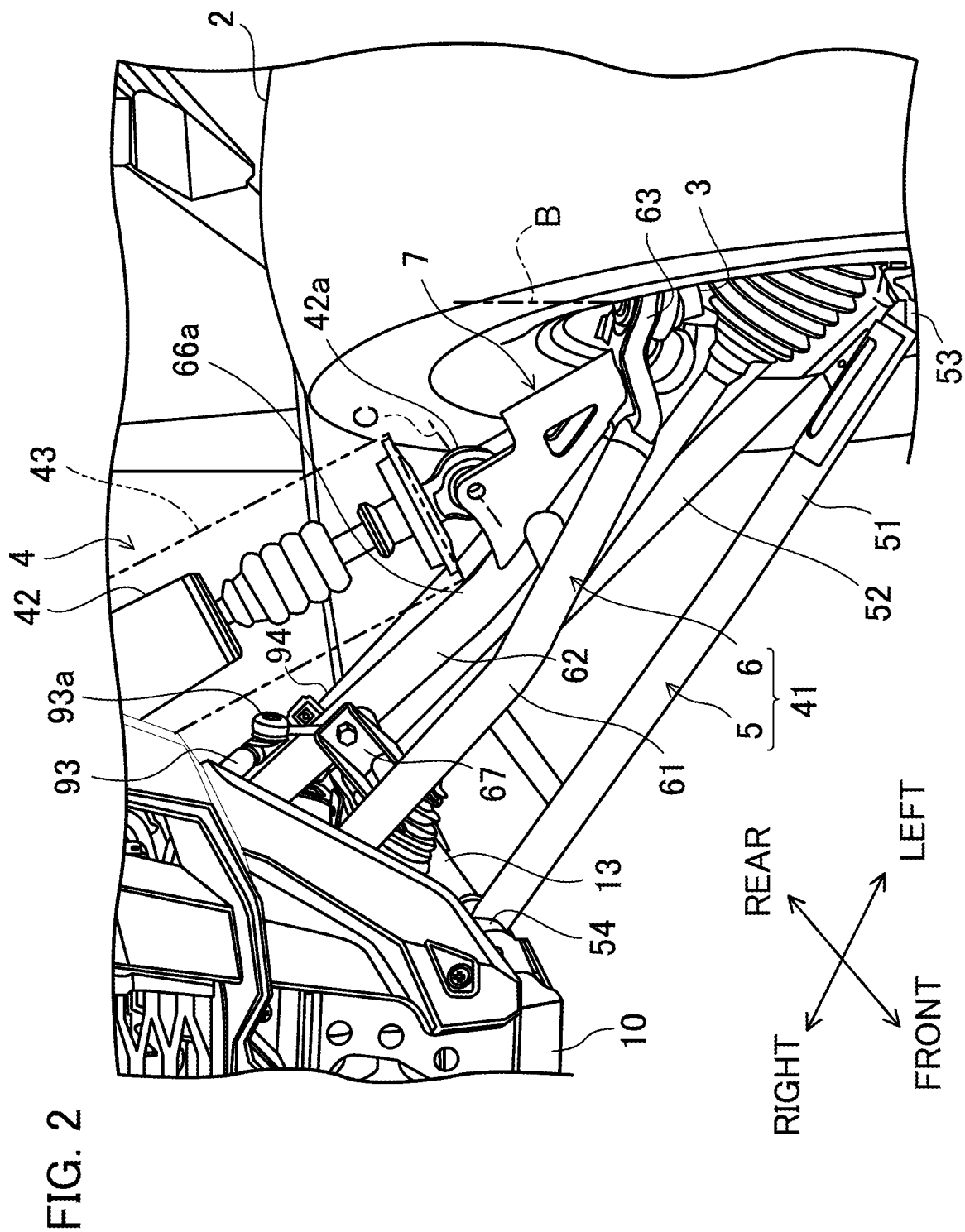
FIG. 2 is a perspective view of a suspension in a state in which a left front wheel has been steered to an outer side and a suspension arm has swung downward.

Hereinafter, an exemplary embodiment will be described based on the drawings. FIG. 1 is a side view of a utility vehicle 100. FIG. 2 is a perspective view of a suspension 4 in a state in which a left front wheel 2 has been steered to an outer side and a suspension arm 41 has swung downward. The utility vehicle 100 can travel off road. The utility vehicle 100 is one example of an off-road vehicle. Hereinafter, the utility vehicle 100 will also be merely referred to as a "vehicle 100."

In the present disclosure, each element of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction."

The vehicle 100 includes a vehicle body frame 1, wheels 2, knuckles 3 supporting the wheels 2, and the suspensions 4 coupling the knuckles 3 to the vehicle body frame 1. The vehicle 100 may further include an outer panel 10. The wheels 2 include the right and left front wheels 2 and right and left rear wheels 2. That is, the vehicle 100 is a four-wheeled vehicle. In the vehicle 100, the front wheels 2 and the peripheral structures thereof are basically bilaterally symmetrical. The suspensions 4 applied to the right and left front wheels 2 have the same configuration.

Figure 3:
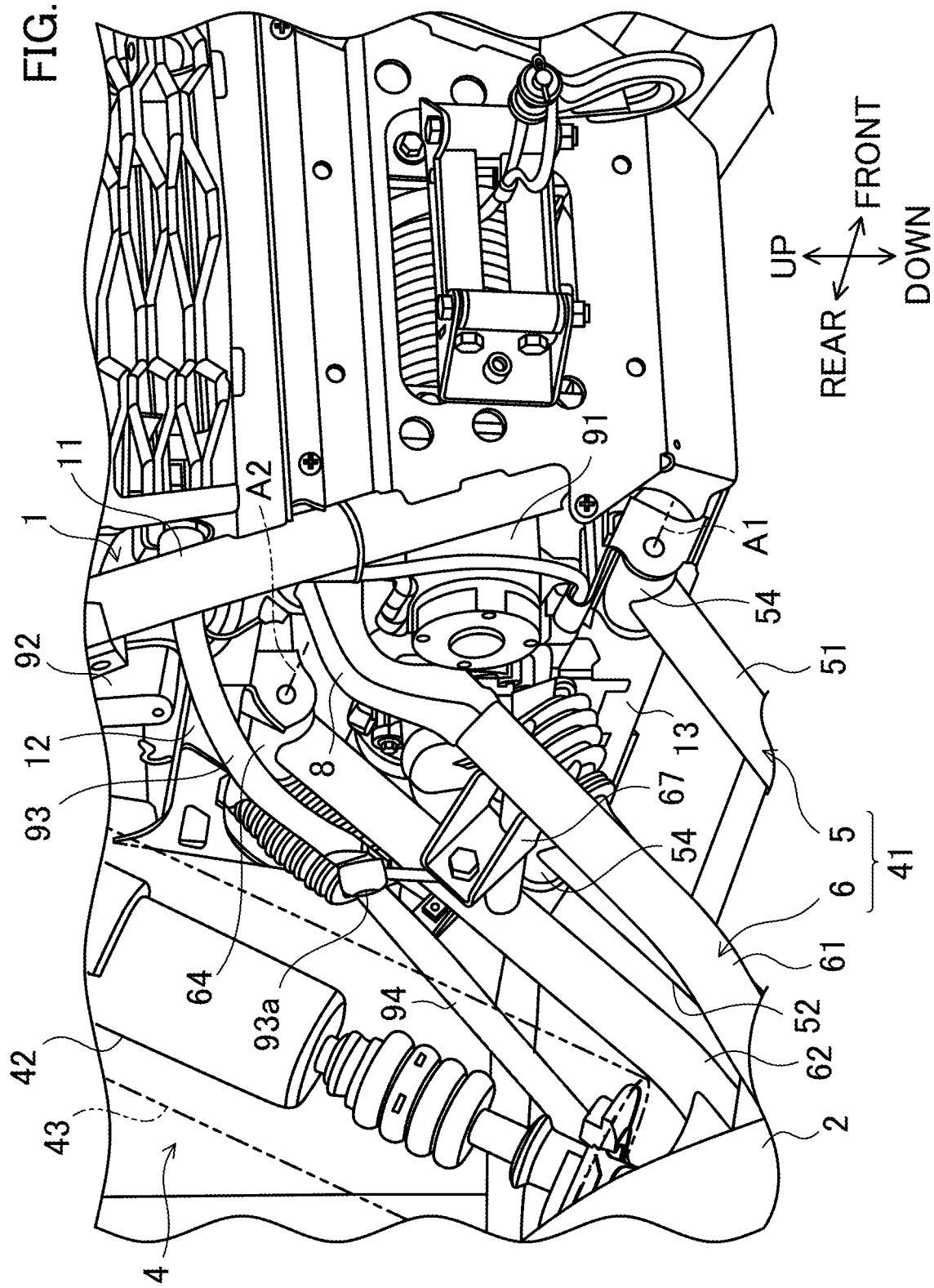
FIG. 3 is a perspective view of a front right portion of the partially-disassembled utility vehicle.

FIG. 3 is a perspective view of a front right portion of the partially-disassembled utility vehicle 100. The vehicle body frame 1 includes a first frame 11 extending substantially in an up-down direction, a second frame 12 extending substantially rearward from an intermediate portion of the first frame 11 in the up-down direction, and a third frame 13 extending substantially rearward from a lower end of the first frame 11. The vehicle body frame 1 is formed, for example, of a metal pipe.

As shown in FIGS. 2 and 3, accessories are located inside the vehicle body frame 1 at the front portion of the vehicle 100. The accessories include, for example, a winch 91, a radiator 92, and a stabilizer 93. The winch 91, the radiator 92, and the stabilizer 93 are attached to the vehicle body frame 1.

For example, the winch 91 is located between the second frame 12 and the third frame 13, and is attached to the first frame 11. The stabilizer 93 is located at a position higher than the second frame 12. An intermediate portion of the stabilizer 93 extends substantially in the vehicle width direction. Both end portions of the stabilizer 93 are bent rearward, and are coupled to the suspensions 4 via links 93a. The radiator 92 is located at a position higher than the second frame 12, and is attached to the first frame 11 and the second frame 12.

The suspension 4 buffers impact and vibration transmitted from a road surface to the vehicle body frame 1. The suspension 4 is a front suspension that suspends the front wheel 2. As shown in FIGS. 2 and 3, the suspension 4 has the suspension arm 41 coupling the knuckle 3 to the vehicle body frame 1 and a shock absorber 42 attached to the suspension arm 41. The suspension arm 41 extends downward diagonally from the vehicle body frame 1 to the knuckle 3. The suspension arm 41 swings relative to the vehicle body frame 1. The suspension 4 may further have a coil spring 43.

The suspension arm 41 includes a lower arm 5 and an upper arm 6 located higher than the lower arm 5. Each of the lower arm 5 and the upper arm 6 entirely extends in the vehicle width direction. An inner end of the lower arm 5 in the vehicle width direction is attached to the third frame 13 so as to rotate about a rotation axis extending substantially in the front-rear direction. An inner end of the upper arm 6 in the vehicle width direction is attached to the second frame 12 so as to rotate about a rotation axis extending substantially in the front-rear direction. An outer end of the lower arm 5 in the vehicle width direction and an outer end of the upper arm 6 in the vehicle width direction are attached to the knuckle 3. The lower arm 5 and the upper arm 6 swing relative to the vehicle body frame 1. In response to swing of the lower arm 5 and the upper arm 6, the knuckle 3 and the wheel 2 swing substantially in the up-down direction. Each of the lower arm 5 and the upper arm 6 is made of metal. Hereinafter, unless otherwise specified, an inner end in the vehicle width direction will be merely referred to as an "inner end," and an outer end in the vehicle width direction will be merely referred to as an "outer end."

The lower arm 5 includes a front arm 51 and a rear arm 52 located at the rear with respect to the front arm 51. The front arm 51 and the rear arm 52 entirely extend in the vehicle width direction. Specifically, the front arm 51 and the rear arm 52 do not extend in parallel with each other, but the rear arm 52 is inclined with respect to the front arm 51. The inner end of the front arm 51 and the inner end of the rear arm 52 are separated from each other. The outer end of the front arm 51 and the outer end of the rear arm 52 are integrally joined to each other. That is, the lower arm 5 has one first arm end 53 at which the outer end of the front arm 51 and the outer end of the rear arm 52 are joined to each other and two second arm ends 54 (in FIG. 3, only one second arm end 54 is shown) which are the inner end of the front arm 51 and the inner end of the rear arm 52. The lower arm 5 is a so-called A-arm. That is, the first arm end 53 is the outer end of the lower arm 5, and the second arm ends 54 are the inner ends of the lower arm 5.

The first arm end 53 is in a ring shape having the center axis extending substantially in the up-down direction. The two second arm ends 54 are separated from each other substantially in the front-rear direction. The two second arm ends 54 are attached to the third frame 13 so as to rotate about a rotation axis A1 extending substantially in the front-rear direction. More specifically, the second arm end 54 is in a cylindrical shape with the rotation axis A1 as a center axis. The lower arm 5 swings about the rotation axis A1 relative to the third frame 13.

Figure 4:
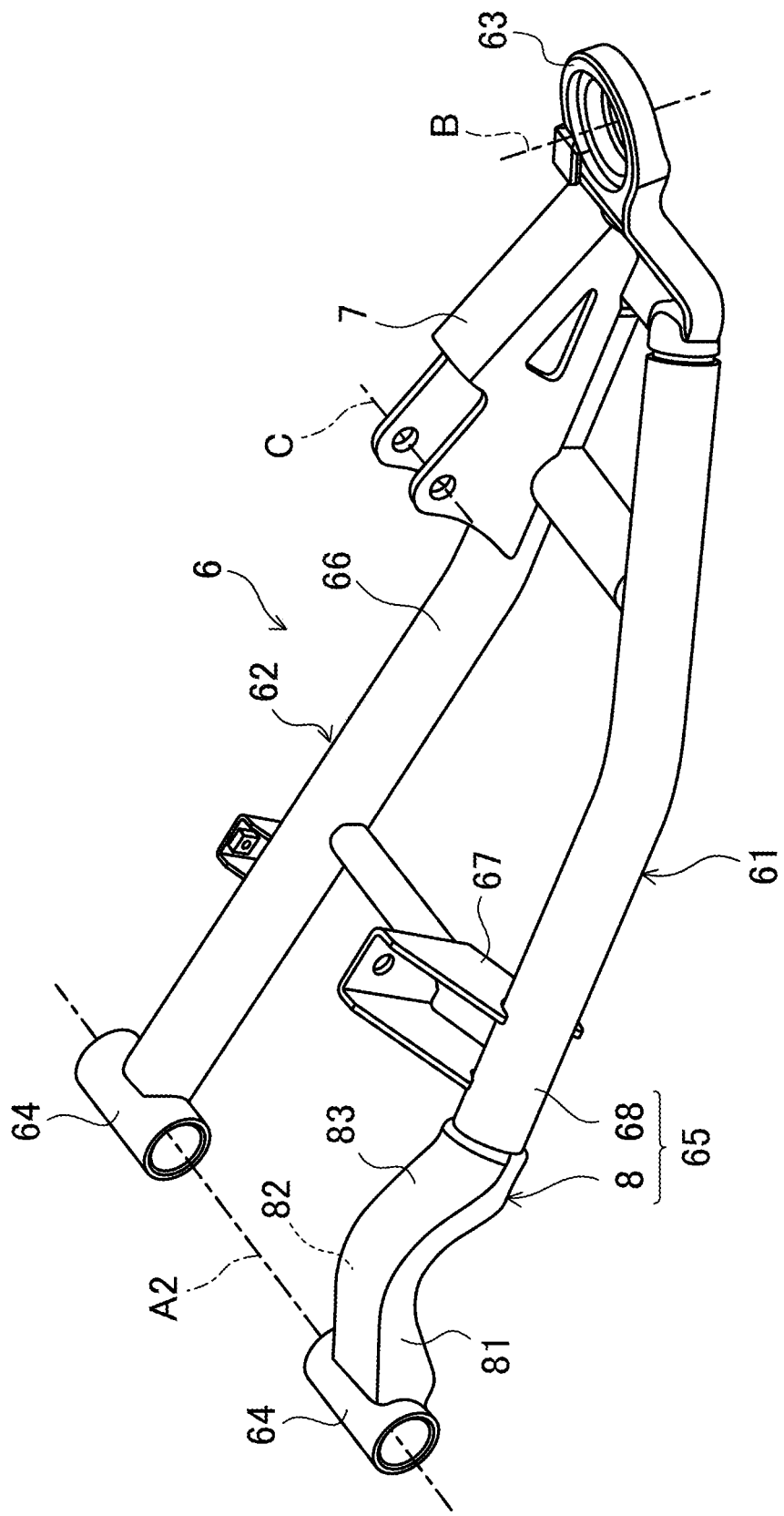
FIG. 4 is a perspective view of an upper arm diagonally from above.

FIG. 4 is a perspective view of the upper arm 6 diagonally from above. The upper arm 6 includes a front arm 61 and a rear arm 62 located at the rear with respect to the front arm 61. The front arm 61 and the rear arm 62 entirely extend in the vehicle width direction. Specifically, the front arm 61 and the rear arm 62 do not extend in parallel with each other, but the rear arm 62 is inclined with respect to the front arm 61. The inner end of the front arm 61 and the inner end of the rear arm 62 are separated from each other. The outer end of the front arm 61 and the outer end of the rear arm 62 are integrally joined to each other. That is, the upper arm 6 has one first arm end 63 at which the outer end of the front arm 61 and the outer end of the rear arm 62 are joined to each other and two second arm ends 64 (in FIG. 3, only one second arm end 64 is shown) which are the inner end of the front arm 61 and the inner end of the rear arm 62. The upper arm 6 is a so-called A-arm. That is, the first arm end 63 is the outer end of the upper arm 6, and the second arm ends 64 are the inner ends of the upper arm 6.

The first arm end 63 is in a ring shape having the center axis extending substantially in the up-down direction. The two second arm ends 64 are separated from each other substantially in the front-rear direction. The two second arm ends 64 are attached to the second frame 12 so as to rotate about a rotation axis A2 extending substantially in the front-rear direction. More specifically, the second arm end 64 is in a cylindrical shape with the rotation axis A2 as a center axis. The upper arm 6 swings about the rotation axis A2 relative to the second frame 12. The rotation axis A2 is substantially parallel with the rotation axis A1. In terms of a position in the front-rear direction, the second arm end 64 of the rear arm 62 is positioned at the front with respect to the second arm end 54 of the rear arm 52 of the lower arm 5. In terms of a position in the front-rear direction, the second arm end 64 of the front arm 61 is substantially at the same position as that of the second arm end 54 of the front arm 51 of the lower arm 5.

The front arm 61 has a bracket 67 to which the stabilizer 93 is attached. Specifically, the bracket 67 is joined to a portion of the front arm 61 between the first arm end 63 and the second arm end 64. An end portion of the stabilizer 93 is attached to the bracket 67 via the link 93a.

The knuckle 3 supports the front wheel 2 via a hub and a hub bearing. The knuckle 3 is supported by the lower arm 5 and the upper arm 6. Specifically, the first arm end 53 of the lower arm 5 supports a lower portion of the knuckle 3. The first arm end 63 of the upper arm 6 supports an upper portion of the knuckle 3. The lower arm 5 and the upper arm 6 support the knuckle 3 such that the knuckle 3 is rotatable about a rotation axis B extending substantially in the up-down direction.

The knuckle 3 has a knuckle arm. The knuckle arm substantially extends rearward. A steering tie rod 94 is attached to the knuckle arm 31 so as to rotate about a rotation axis substantially parallel with the rotation axis B. The steering tie rod 94 is attached to the knuckle arm at a position at the rear with respect to the rotation axis B.

The steering tie rod 94 extends outward in the vehicle width direction from a steering gear box located on the vehicle body frame 1. The steering tie rod 94 extends and contracts according to steering operation. The knuckle 3 rotates about the rotation axis B in response to extension and contraction of the steering tie rod 94. Accordingly, the direction of the front wheel 2 changes.

The shock absorber 42 is, for example, an air cylinder or a hydraulic cylinder. The shock absorber 42 couples the vehicle body frame 1 and the suspension arm 41 to each other. The coil spring 43 is attached to the periphery of the shock absorber 42. The coil spring 43 elastically couples the vehicle body frame 1 and the suspension arm 41 to each other. Under action of the static load of the vehicle 100, the lower arm 5 and the upper arm 6 are inclined downward toward the outer side in the vehicle width direction. When the front wheel 2 receives impact from the road surface, the impact is transmitted to the shock absorber 42 and the coil spring 43 via the suspension arm 41. The shock absorber 42 and the coil spring 43 absorb and damp such impact. Accordingly, the impact and vibration transmitted to the vehicle body frame 1 are buffered.

The shock absorber 42 is attached to the rear arm 62 among the front arm 61 and the rear arm 62. The rear arm 62 has an arm body 66 and a bracket 7 to which the lower end 42a of the shock absorber 42 is attached. The bracket 7 is located on an upper surface of the arm body 66. The bracket 7 is joined to the arm body 66 by welding. The lower end 42a of the shock absorber 42 is attached to the rear arm 62 via the bracket 7. The bracket 7 supports the lower end 42a of the shock absorber 42 such that the lower end 42a is rotatable about a predetermined rotation axis C.

Figure 5:
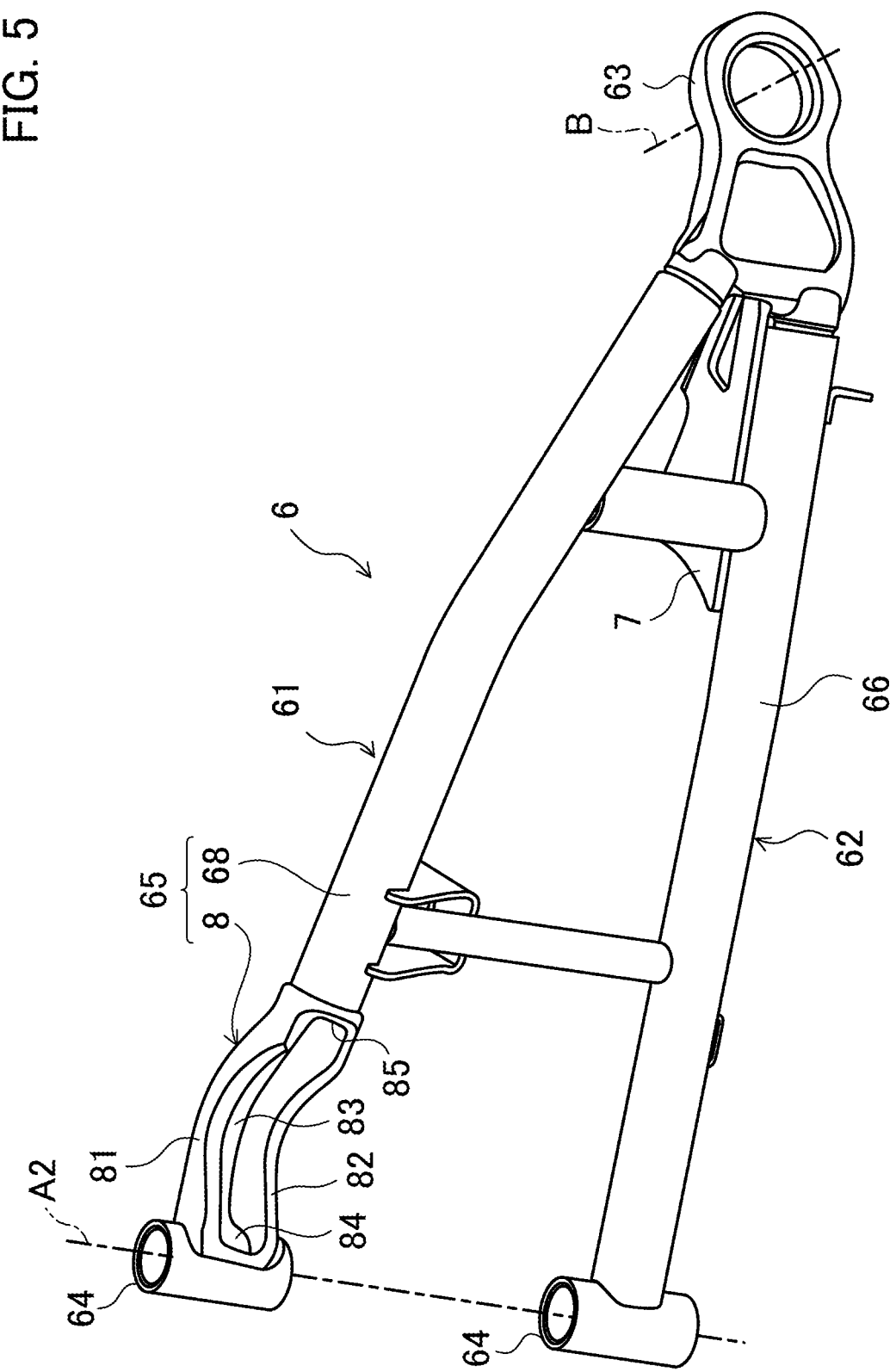
FIG. 5 is a perspective view of the upper arm diagonally from below.

Subsequently, a detailed configuration of the suspension 4 will be described. FIG. 5 is a perspective view of the upper arm 6 diagonally from below.

The suspension arm 41 has a curve 8 to avoid contact with other components. Specifically, the upper arm 6 of the suspension arm 41 has the curve 8. At least one of the front arm 61 or the rear arm 62 of the upper arm 6 has the curve 8. In this example, the front arm 61 has the curve 8.

The curve 8 is positioned closer to the vehicle body frame 1 with respect to the center in a longitudinal direction of the suspension arm 41, i.e., a longitudinal direction of the front arm 61.

The front arm 61 further has, in addition to the curve 8, the second arm end 64 which is swingably supported on the vehicle body frame 1 and to which the curve 8 is joined and a second portion 68 joined to the curve 8. Specifically, the front arm 61 has the first arm end 63 supporting the knuckle 3, the second arm end 64 swingably supported on the vehicle body frame 1, and the arm body 65 joined to the first arm end 63 and the second arm end 64. The arm body 65 has the curve 8 as a first portion and the second portion 68 joined to the first portion. The second portion 68 may be slightly curved or bent. Note that the curvature of the curve 8 is greater than the curvature of the second portion 68. In this example, the second portion 68 is a pipe.

Note that the rear arm 62 has the first arm end 63 supporting the knuckle 3, the second arm end 64 swingably supported on the vehicle body frame 1, and the arm body 66 joined to the first arm end 63 and the second arm end 64. The first arm end 63 is common between the rear arm 62 and the front arm 61. The second arm end 64 of the rear arm 62 is different from the second arm end 64 of the front arm 61. The arm body 66 includes no curve 8. The arm body 66 is a pipe.

The curve 8 curves in an upwardly-raised shape. In other words, a lower edge of the curve 8 is recessed upward. The second arm end 64 is positioned on an extension of the axis of the second portion 68, specifically an extension of the axis of an end portion of the second portion 68 connected to the curve 8. The curve 8 curves upward so as to separate from the extension.

Specifically, the curve 8 has a first side wall 81 extending in the longitudinal direction of the suspension arm 41, i.e., the longitudinal direction of the front arm 61, a second side wall 82 facing the first side wall 81 and extending in the longitudinal direction, and a coupling wall 83 coupling an upper edge of the first side wall 81 and an upper edge of the second side wall 82 to each other and extending in the longitudinal direction. The coupling wall 83 curves in an upwardly-raised shape. That is, the first side wall 81, the second side wall 82, and the coupling wall 83 are configured such that the section of the curve 8 is substantially in a C-shape. With this configuration, the stiffness of the curve 8 is improved, and the curve 8 is reduced in weight.

Each of the first side wall 81 and the second side wall 82 has a width in the up-down direction. The width of an end portion of the first side wall 81 closer to the second arm end 64 in the longitudinal direction is greater than the width of an intermediate portion of the first side wall 81 in the longitudinal direction. Similarly, the width of an end portion of the second side wall 82 closer to the second arm end 64 in the longitudinal direction is greater than the width of an intermediate portion of the second side wall 82 in the longitudinal direction.

The curve 8 is a forged or casted piece. A portion of the arm body 65 of the front arm 61 on the inner side in the vehicle width direction with respect to the curve 8 is the second portion 68. For example, the second portion 68 is rolled or extruded, for example. That is, the stiffness of the curve 8 is higher than the stiffness of the second portion 68.

The curve 8 is joined to the second arm end 64 and the second portion 68. The entire length of a portion of the curve 8 joined to the second arm end 64 is longer than the entire length of a portion of the curve 8 joined to the second portion 68. Specifically, the curve 8 further has a first end wall 84 joined to the second arm end 64 and a second end wall 85 joined to the second portion 68. The first end wall 84 is connected to one edge of each of the first side wall 81, the second side wall 82, and the coupling wall 83 in the longitudinal direction. The second end wall 85 is connected to the other edge of each of the first side wall 81, the second side wall 82, and the coupling wall 83 in the longitudinal direction. The first end wall 84 curves corresponding to an outer peripheral surface of the second arm end 64. An outer peripheral edge of the first end wall 84 is joined to the second arm end 64 by, e.g., welding. The second end wall 85 is in a circular shape corresponding to the outer diameter of the second portion 68. An outer peripheral edge of the second end wall 85 is joined to the second portion 68 by, e.g., welding. The entire length of the outer peripheral edge of the first end wall 84 is longer than the entire length of the outer peripheral edge of the second end wall 85. Thus, the entire length of the portion of the curve 8 joined to the second arm end 64 is longer than the entire length of the portion of the curve 8 joined to the second portion 68.

Figure 6:
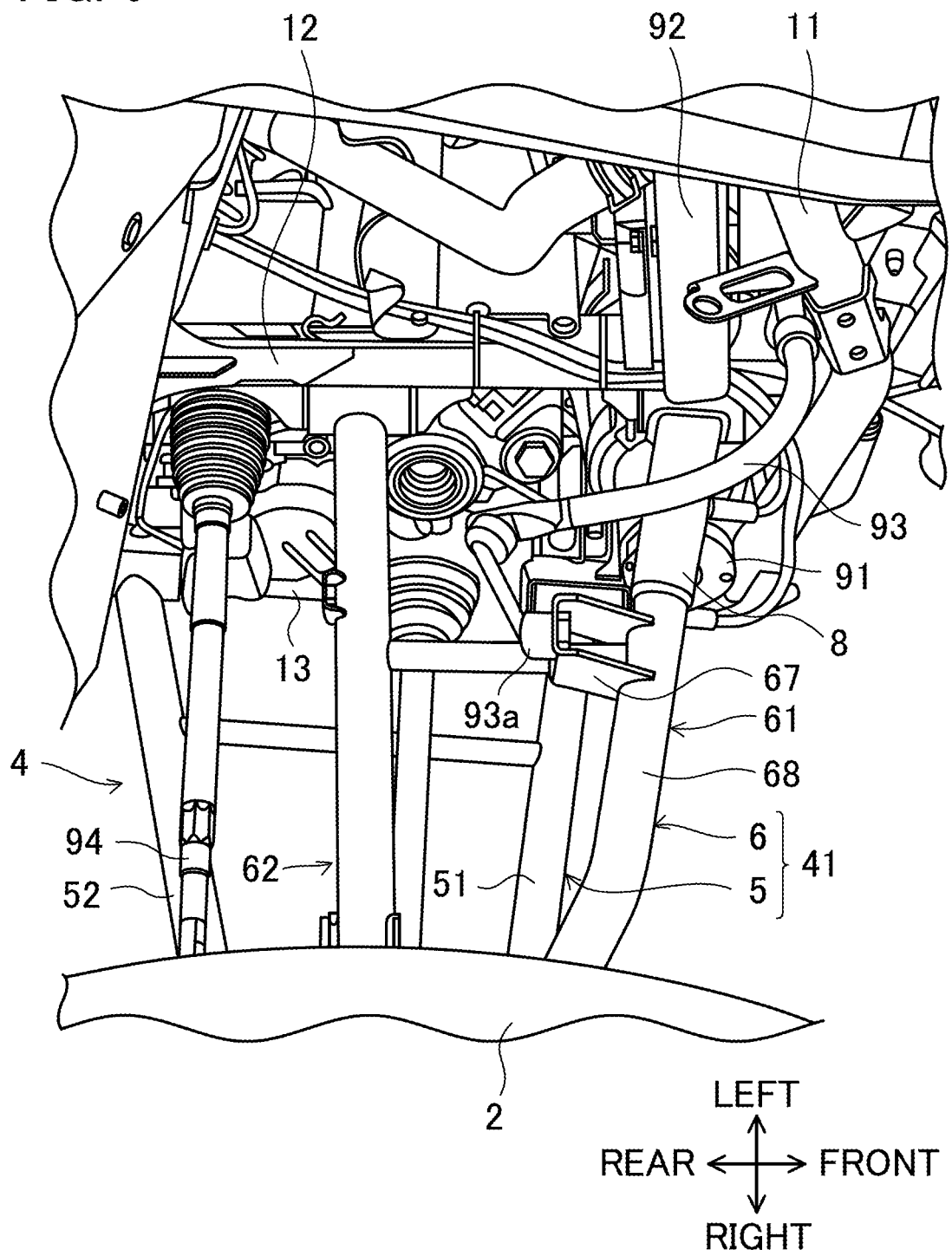
FIG. 6 is a perspective view of the front right portion of the partially-disassembled utility vehicle diagonally from an upper right side.
Figure 7:
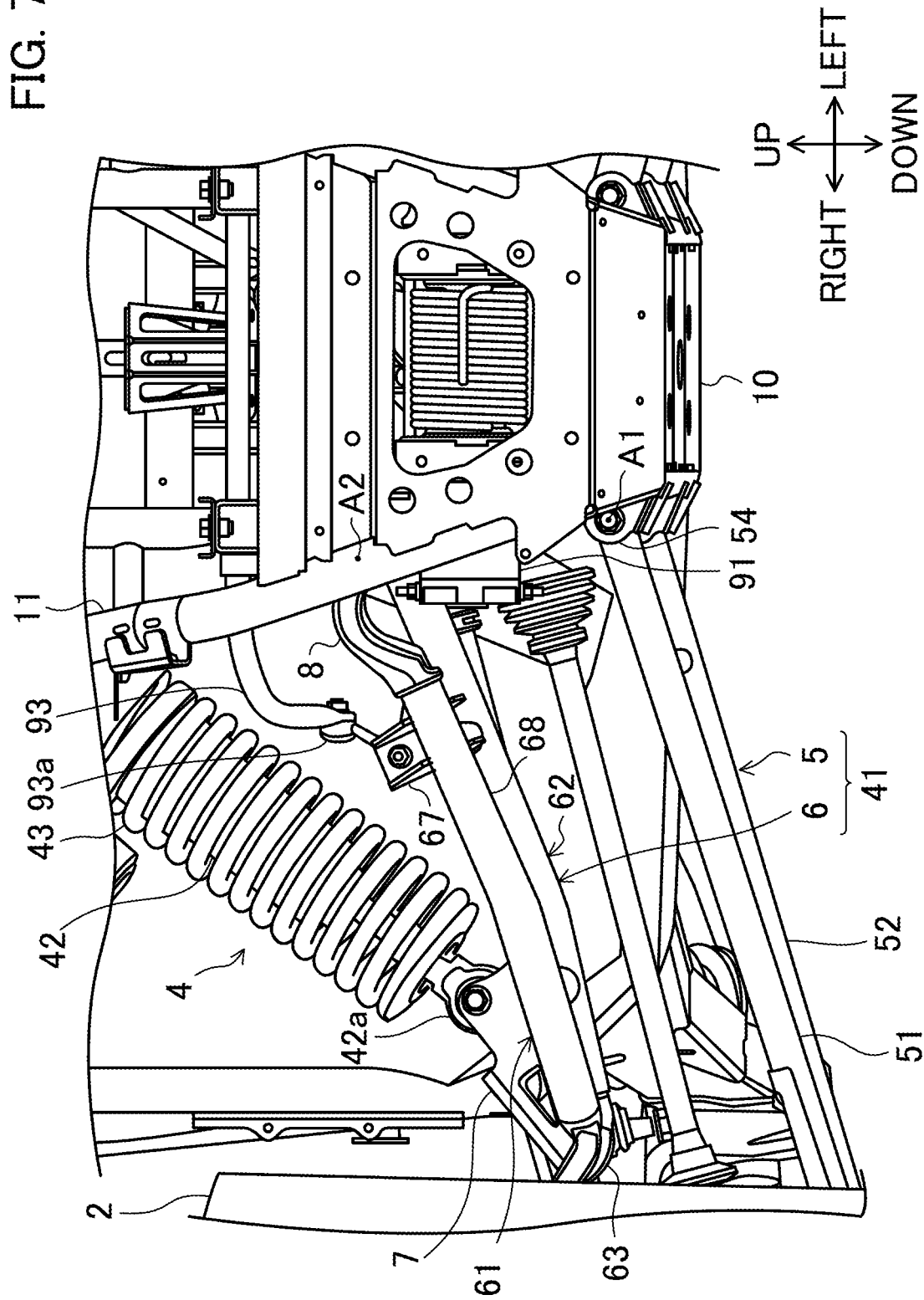
FIG. 7 is a front view of the partially-disassembled utility vehicle showing a right front wheel and the periphery thereof.

FIG. 6 is a perspective view of a front right portion of the partially-disassembled utility vehicle 100 diagonally from the upper right side. FIG. 7 is a front view of the partially-disassembled utility vehicle 100 showing the right front wheel and the periphery thereof. In this example, the other components, contact with which is avoided by the curve 8, include the winch 91. The winch 91 is located on a side opposite to the raised side of the curve 8. In other words, the "side opposite to the raised side" means a side on which the center of the curvature of the curve is positioned. In this example, since the curve 8 curves in the upwardly-raised shape, the "side opposite to the raised side" is the lower side with respect to the curve 8. The position of the winch 91 in the front-rear direction and the position of the front arm 61 in the front-rear direction are substantially the same as each other. In other words, when viewed in the up-down direction, the winch 91 and the front arm 61 at least partially overlap with each other.

The winch 91 protrudes outward in the vehicle width direction with respect to the rotation axis A2 which is the swing axis of the upper arm 6. In other words, the winch 91 has a portion located on the outer side with respect to the rotation axis A2. Alternatively, the winch 91 protrudes outward in the vehicle width direction with respect to a virtual plane including the rotation axis A2 and expanding in the up-down direction.

When the front wheel 2 receives impact from the road surface, the impact is transmitted, in the suspension 4 configured in this manner, to the shock absorber 42 and the coil spring 43 via the suspension arm 41. The shock absorber 42 and the coil spring 43 contract to absorb and damp the impact. At this point, the suspension arm 41 swings relative to the vehicle body frame 1 in response to contraction of the shock absorber 42 and the coil spring 43.

Specifically, the lower arm 5 and the upper arm 6 substantially swing up and down relative to the vehicle body frame 1. Since the upper arm 6 is supported on the vehicle body frame 1 at the relatively-upper position, other components, i.e., the accessories etc., may be present below the upper arm 6. The upper arm 6 has the curve 8 curving in the upwardly-raised shape. With this configuration, contact between the upper arm 6 and the components therebelow can be avoided.

Particularly, tendency shows that more components are located below a portion of the upper arm 6 closer to the vehicle body frame 1. i.e., below an inner end portion of the upper arm 6, as compared to below a portion of the upper arm 6 closer to the knuckle 3. The curve 8 is positioned closer to the vehicle body frame 1 with respect to the center of the upper arm 6 in the longitudinal direction. With this configuration, contact between the upper arm 6 and the components can be effectively avoided.

Figure 8:
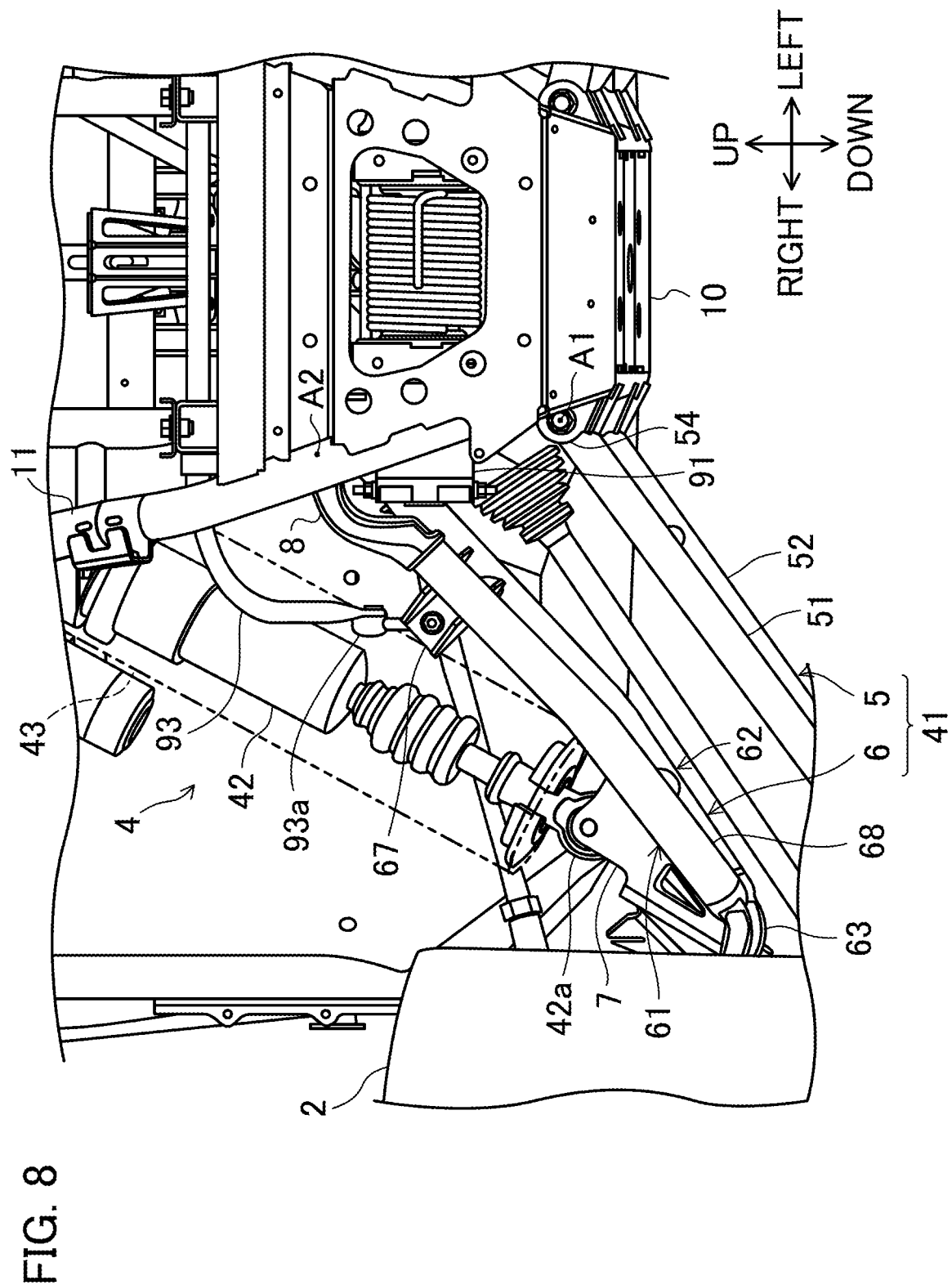
FIG. 8 is a front view of the utility vehicle in a state in which the suspension arm has swung to the lowermost position, FIG. 8 corresponding to FIG. 7.

FIG. 8 is a front view of the utility vehicle 100 in a state in which the suspension arm 41 has swung to the lowermost position. FIG. 8 corresponding to FIG. 7. In this example, the winch 91 is located lower than the rotation axis A2 which is the swing center of the upper arm 6, and protrudes outward in the vehicle width direction with respect to the rotation axis A2. Thus, when the upper arm 6 swings downward relative to the vehicle body frame 1, the upper arm 6 approaches the winch 91. The curve 8 is located at a portion of the upper arm 6 approaching the winch 91. The curve 8 has the upwardly-raised (i.e., upwardly-recessed) shape. The curve 8 has a clearance from the winch 91, i.e., the other components, in a state in which the suspension arm 41 has swung to the lowermost position relative to the vehicle body frame 1. As a result, the upper arm 6 can be compactly located considering a relationship with the winch 91.

Figure 9:
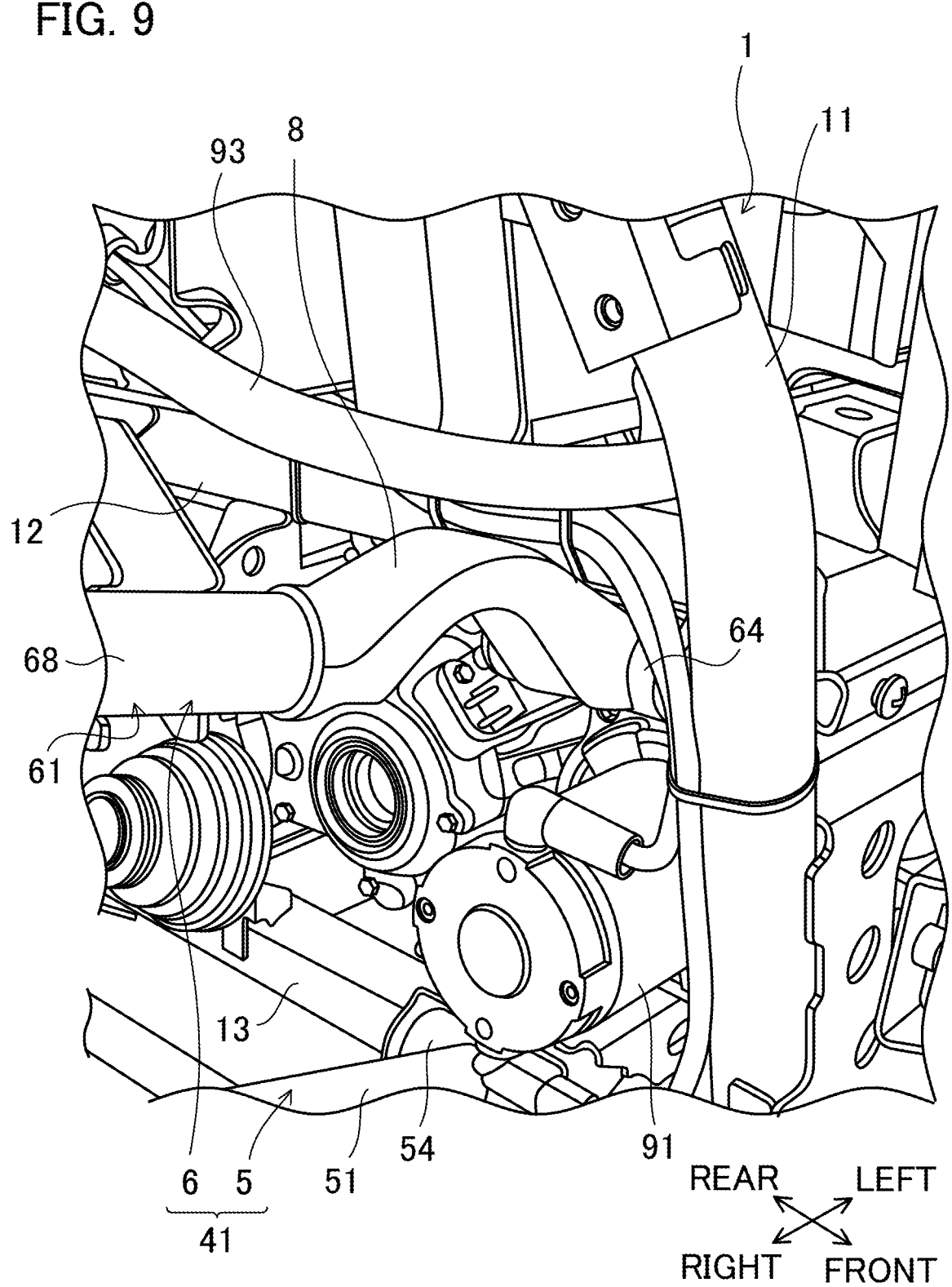
FIG. 9 is a perspective view showing, diagonally from the upper right side, the front right portion of the partially-disassembled utility vehicle 100 in a state in which the suspension arm 41 has swung upward.

FIG. 9 is a perspective view showing, diagonally from the upper right side, the front right portion of the partially-disassembled utility vehicle 100 in a state in which the suspension arm 41 has swung upward. Since the curve 8 avoids contact with the other components, the upper arm 6 can be attached to the vehicle body frame 1 at a relatively-low position. For example, if the upper arm 6 is attached to the vehicle body frame 1 at a relatively-high position, contact between the upper arm 6 and the components therebelow can be avoid even without the curve 8. However, if the upper arm 6 is attached to the vehicle body frame 1 at the relatively-high position, there is a problem that when the upper arm 6 swings upward, the upper arm 6 and the components thereabove contact each other. Since the upper arm 6 has the curve 8, the upper arm 6 can be attached to the vehicle body frame 1 at the relatively-low position while contact between the upper arm 6 and the components therebelow is avoided. Since the attachment position of the upper arm 6 to the vehicle body frame 1 is low, contact between the upper arm 6 and the components thereabove is easily avoided when the suspension arm 41 swings upward, as shown in FIG. 9.

The front arm 61 of the upper arm 6 has the curve 8. With this configuration, contact between the upper arm 6 and the components located at relatively-front positions at the front portion of the vehicle body can be avoided. In this example, the rear arm 62 has no probability of contacting the components below the rear arm 62. Only the front arm 61 has the curve 8, and therefore, the configuration of the rear arm 62 can be simplified.

The curve 8 is the forged or casted piece. The strength of the curve 8 can be improved as compared to a simple rolled or extruded pipe, for example. The portion of the arm body 65 of the front arm 61 on the inner side in the vehicle width direction with respect to the curve 8, i.e., the second portion 68, is the pipe. The stiffness of the curve 8 is higher than the stiffness of the second portion 68. Since the curve 8 curves, stress is likely to be concentrated on the curve 8. Since the curve 8 has a high stiffness, deformation of the curve 8 can be prevented. Further, the curve 8 has the substantially C-shaped sectional shape opening downward. With this configuration, the stiffness of the curve 8 is improved, and the curve 8 is reduced in weight.

Since the curve 8 is the forged or casted piece, the curve 8 in a complicated shape can be easily obtained. For example, the curve 8 having the substantially C-shaped sectional shape is easily obtained.

The amount of joint between the curve 8 and the second arm end 64 is greater than the amount of joint between the curve 8 and the second portion 68. Specifically, the outer peripheral edge of the first end wall 84 of the curve 8 is joined to the second arm end 64. The outer peripheral edge of the second end wall 85 of the curve 8 is joined to the second portion 68. The entire length of the outer peripheral edge of the first end wall 84 is longer than the entire length of the outer peripheral edge of the second end wall 85. With this configuration, the strength of joint of the curve 8 to the second arm end 64 is improved.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The configuration of the suspension arm 41 is not limited to the above-described configuration. The suspension arm 41 may have only one of the lower arm 5 or the upper arm 6. The suspension arm 41 is not necessarily the so-called A-arm. The suspension arm 41 may include one or more arms. The arms may be independent of each other, or be coupled to each other.

Figure 10:
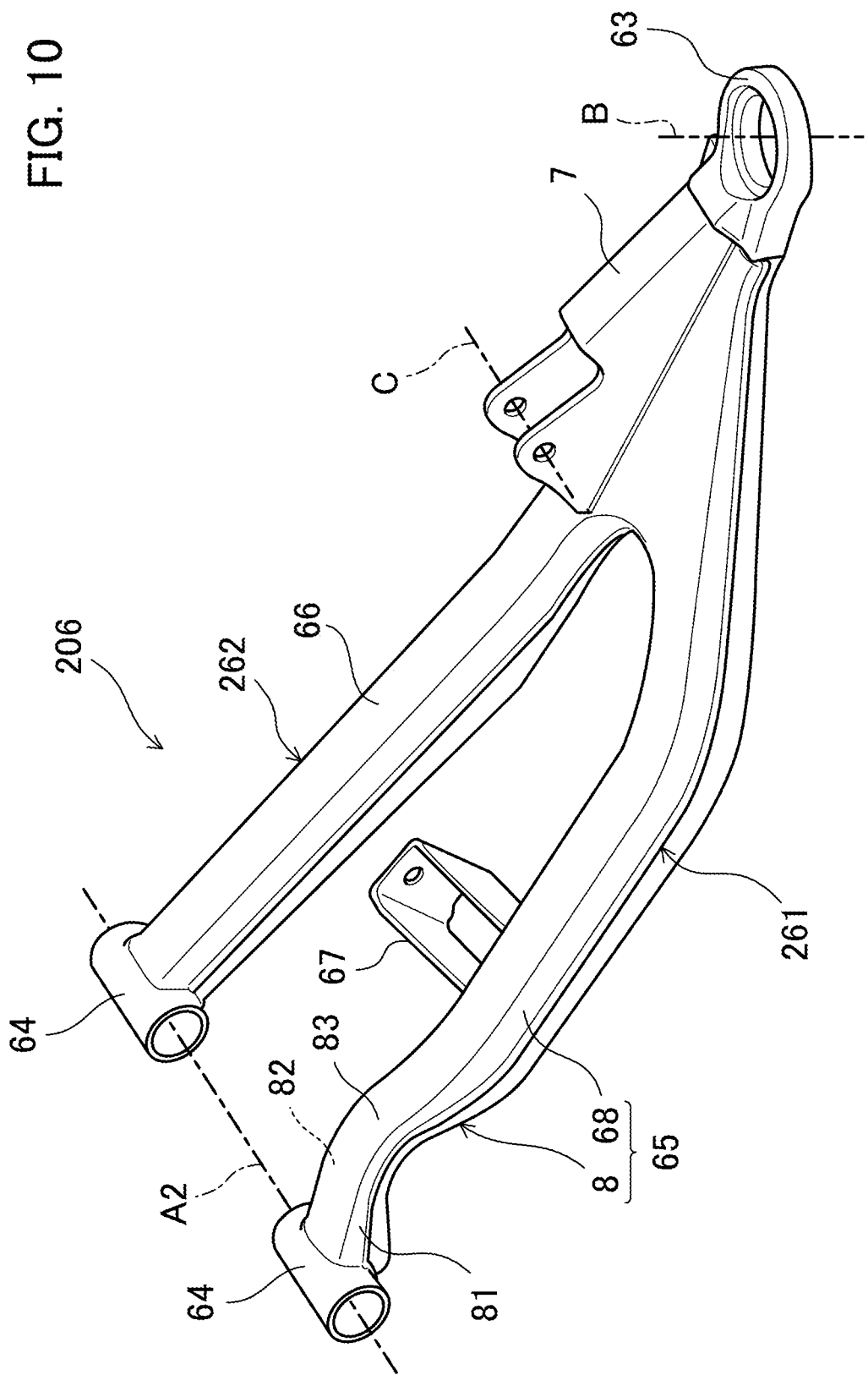
FIG. 10 is a perspective view of an upper arm according to another embodiment.

Each of the lower arm 5 and the upper arm 6 is not limited to one formed of the pipe. For example, each of the lower arm 5 and the upper arm 6 may be formed of two divided bodies joined to each other. FIG. 10 is a perspective view of an upper arm 206 according to another embodiment. Similar reference numerals are used to represent elements of the upper arm 206 similar to those of the upper arm 6, and description thereof will be omitted. A front arm 261 and a rear arm 262 of the upper arm 206 are formed of two divided bodies joined in a hollow shape. The curve 8 is also formed of two divided bodies. Note that the curve 8 may be a forged or casted piece and be joined, by, e.g., welding, to another portion formed of two divided bodies.

The curve 8 is not necessarily included in the front arm 61 of the upper arm 6, but may be included in the rear arm 62. Alternatively, both the front arm 61 and the rear arm 62 may have the curves 8. Alternatively, the curve 8 may be included not in the upper arm 6, but in the lower arm 5. In this case, at least one of the front arm 51 or the rear arm 52 may include the curve 8.

The curve 8 may be separated from the inner end of the suspension arm 41, such as the second arm end 64, as long as the curve 8 is located closer to the vehicle body frame 1 with respect to the center of the suspension arm 41 in the longitudinal direction.

The curving direction of the curve 8 is determined according to the relationship with the components, contact with which is avoided. For example, the curve 8 does not necessarily curve upward, but may curve in a forward-raised shape.

The shape of the curve 8 is not limited to the above-described shape. For example, the curve 8 may have a closed sectional shape.

The components, contact with which is avoided by the curve 8, may be components other than the winch 91. For example, the target component may be at least one of the vehicle body frame 1, the radiator 92, or the stabilizer 93.

The second portion 68 is not necessarily the pipe. The second portion 68 may be a forged or casted piece.

The technique of the present disclosure as described above will be summarized as follows.

[1] The suspension 4 includes the suspension arm 41 that couples the knuckle 3 to the vehicle body frame 1 and swings relative to the vehicle body frame 1. The suspension arm 41 has the curve 8 to avoid contact with the other components, and the curve 8 is positioned closer to the vehicle body frame 1 with respect to the center of the suspension arm 41 in the longitudinal direction thereof.

According to this configuration, contact between the suspension arm 41 and the other components can be prevented by the curve 8. That is, more components are located at the portion closer to the vehicle body frame 1 than the portion closer to the knuckle 3 in the vehicle width direction. When the suspension arm 41 swings, the portion of the suspension arm 41 closer to the vehicle body frame 1 with respect to the center in the longitudinal direction is more likely to approach the other components than the portion of the suspension arm 41 closer to the knuckle 3 with respect to the center in the longitudinal direction is. Since the curve 8 is located at the portion of the suspension arm 41 closer to the vehicle body frame 1 with respect to the center in the longitudinal direction, contact between the suspension arm 41 and the other components can be prevented. As a result, the suspension 4 can be compactly located.

[2] In the suspension 4 of [1], the suspension arm 41 extends downward diagonally from the vehicle body frame 1 to the knuckle 3, and the curve 8 curves in the upwardly-raised shape.

According to this configuration, the suspension arm 41 extends downward diagonally from the vehicle body frame 1. For this reason, the suspension arm 41 is likely to contact the components located below the suspension arm 41. Since the curve 8 curves in the upwardly-raised shape, the space is ensured between the curve 8 and the components therebelow. As a result, contact of the suspension arm 41 with the components therebelow is easily avoided.

[3] In the suspension 4 of [1] or [2], the curve 8 has the clearance from the other components in a state in which the suspension arm 41 has swung to the lowermost position relative to the vehicle body frame 1.

According to this configuration, even when the suspension arm 41 swings to the lowermost position, contact between the suspension arm 41 and the other components is prevented.

[4] In the suspension 4 of any one of [1] to [3], the curve 8 is forged or casted.

According to this configuration, the stiffness of the curve 8 can be improved. Further, the curve 8 in the complicated shape is easily obtained.

[5] In the suspension 4 of any one of [1] to [4], the suspension arm 41 further has the second portion 68 joined to the curve 8 which is the first portion, and the second portion 68 is the pipe.

According to this configuration, the second portion 68 can be easily manufactured as compared to the curve 8.

[6] In the suspension 4 of any one of [1] to [5], the suspension arm 41 includes the front arm 61 and the rear arm 62 located at the rear with respect to the front arm 61, and at least one of the front arm 61 or the rear arm 62 has the curve 8.

According to this configuration, at least one of the front arm 61 or the rear arm 62 has the curve 8 as necessary depending on the other components. Only one of the front arm 61 or the rear arm 62 may have the curve 8, or both the front arm 61 and the rear arm 62 may have the curves 8. Both the front arm 61 and the rear arm 62 do not necessarily have the curves 8, and therefore, the arm having no probability of contacting the other components does not necessarily have the curve 8. The curve 8 is complicated in manufacturing as compared to a straight arm, and therefore, the arm with no curve 8 is simply manufactured.

[7] In the suspension 4 of any one of [1] to [6], the suspension arm 41 includes the lower arm 5 and the upper arm 6 located higher than the lower arm 5, the upper arm 6 has the front arm 61 and the rear arm 62 located at the rear with respect to the front arm 61, and the front arm 61 has the curve 8.

According to this configuration, contact between the upper arm 6 and the components located at the relatively-front positions at the front portion of the vehicle body can be prevented.

[8] In the suspension 4 of any one of [1] to [7], the suspension arm 41 is supported so as to swing about the predetermined axis A2 relative to the vehicle body frame 1, and the other components are located on the side opposite to the raised side of the curve 8 and are located on the outer side in the vehicle width direction with respect to the rotation axis A2.

According to this configuration, the other components are at least partially positioned on the outer side in the vehicle width direction with respect to the rotation axis A2 of the suspension arm 41. That is, when the suspension arm 41 swings about the rotation axis A2, the suspension arm 41 and the other components easily contact each other. However, the other components are located on the side opposite to the raised side of the curve 8. Since the curve 8 curves, a distance is ensured between the curve 8 and the other components. Thus, even in a situation where the suspension arm 41 and the other components easily contact each other, the curve 8 ensures the distance between the suspension arm 41 and the other components, and contact therebetween is prevented.

[9] In the suspension 4 of any one of [1] to [8], the curve 8 has the first side wall 81 extending in the longitudinal direction of the suspension arm 41; the second side wall 82 facing the first side wall 81 and extending in the longitudinal direction, and the coupling wall 83 coupling the upper edge of the first side wall 81 and the upper edge of the second side wall 82 to each other and extending in the longitudinal direction.

According to this configuration, the curve 8 can be reduced in weight while the bending stiffness of the curve 8 is improved.

[10] In the suspension 4 of any one of [1] to [9], the suspension arm 41 further has the second arm end 64 which is swingably supported on the vehicle body frame 1 and to which the curve 8 is joined and the second portion 68 joined to the curve 8 which is the first portion, and the entire length of the portion of the curve 8 joined to the second arm end 64 is longer than the entire length of the portion of the curve 8 joined to the second portion 68.

According to this configuration, the strength of joint between the curve 8 and the second arm end 64 can be improved. Stress is likely to be concentrated on the second arm end 64 of the suspension arm 41 and the periphery thereof. Since the strength of joint between the curve 8 and the second arm end 64 is improved, the strength of the suspension arm 41 can be improved.

[11] In the suspension 4 of any one of [1] to [10], the other components include at least one of the winch 91, the radiator 92, the stabilizer 93, or the vehicle body frame 1.

According to this configuration, contact between the suspension arm 41 and at least one of the winch 91, the radiator 92, the stabilizer 93, or the vehicle body frame 1 can be prevented.

[12] The utility vehicle 100 (off-road vehicle) includes the a vehicle body frame 1, the front wheel 2, the knuckle 3 that supports the front wheel 2, and the suspension 4 that couples the knuckle 3 to the vehicle body frame 1. The suspension 4 has the suspension arm 41 that couples the knuckle 3 to the vehicle body frame 1 and swings relative to the vehicle body frame 1. The suspension arm 41 has the curve 8 to avoid contact with the other components. The curve 8 is positioned closer to the vehicle body frame 1 with respect to the center of the suspension arm 41 in the longitudinal direction thereof.

According to this configuration, contact between the suspension arm 41 and the other components can be prevented by the curve 8. That is, more components are located at the portion closer to the vehicle body frame 1 than the portion closer to the knuckle 3 in the vehicle width direction. When the suspension arm 41 swings, the portion of the suspension arm 41 closer to the vehicle body frame 1 with respect to the center in the longitudinal direction is more likely to approach the other components than the portion of the suspension arm 41 closer to the knuckle 3 with respect to the center in the longitudinal direction is. Since the curve 8 is located at the portion of the suspension arm 41 closer to the vehicle body frame 1 with respect to the center in the longitudinal direction, contact between the suspension arm 41 and the other components can be prevented. As a result, the suspension 4 can be compactly located.

What is claimed:

1. A suspension comprising:
a suspension arm that couples a knuckle to a vehicle body frame and swings relative to the vehicle body frame; and
a shock absorber attached to the suspension arm,
wherein:
the suspension arm has a curve which curves in an upwardly raised shape to avoid contact with another component,
the another component is on an inside of the curve, and
the suspension arm is coupled to the vehicle body frame at the curve,
wherein the suspension arm extends downward diagonally at all portions thereof from the vehicle body frame to the knuckle.

2. The suspension of claim 1, wherein:
the another component is located below the suspension arm, when a vehicle connected to the suspension is in an upright position, and
the curve has a clearance from the another component in a state in which the suspension arm has swung to a lowermost position relative to the vehicle body frame.

3. The suspension of claim 1, wherein:
the curve is forged or casted.

4. The suspension of claim 3, wherein:
the suspension arm further has a second portion joined to the curve which is a first portion, and
the second portion is a pipe.

5. The suspension of claim 1, wherein:
the suspension arm includes a front arm and a rear arm located at a rear with respect to the front arm, and
at least one of the front arm or the rear arm has the curve.

6. The suspension of claim 1, wherein:
the suspension arm includes a lower arm and an upper arm located higher than the lower arm,
the upper arm has a front arm and a rear arm located at a rear with respect to the front arm, and
the front arm has the curve.

7. The suspension of claim 1, wherein:
the suspension arm is supported so as to swing about a predetermined axis relative to the vehicle body frame, and
the another component is located on a side opposite to a raised side of the curve, and is located on an outer side in a vehicle width direction with respect to the axis.

8. The suspension of claim 1, wherein:
the curve has a first side wall extending in a longitudinal direction of the suspension arm, a second side wall facing the first side wall and extending in the longitudinal direction, and a coupling wall coupling an upper edge of the first side wall and an upper edge of the second side wall to each other and extending in the longitudinal direction.

9. The suspension of claim 1, wherein:
the suspension arm further has an arm end which is swingably supported on the vehicle body frame and to which the curve is joined and a second portion joined to the curve which is a first portion, and
an entire length of a portion of the curve joined to the arm end is longer than an entire length of a portion of the curve joined to the second portion.

10. The suspension of claim 1, wherein:
the another component includes at least one of a winch, a radiator, a stabilizer, or the vehicle body frame.

11. The suspension of claim 1, wherein;
the suspension arm further has an arm end which is swingably supported on the vehicle body frame and to which the curve is joined and a second portion joined to the curve which is a first portion, and
the arm end is positioned on an extension of an axis of the second portion.

12. The suspension of claim 1, wherein:
the suspension arm further has an arm end which is swingably supported on the vehicle body frame and to which the curve is joined and a second portion joined to the curve which is a first portion, and
the curve curves upward to separate from an extension of an axis of the second portion.

13. The suspension of claim 1, wherein:
the another component include a winch,
the winch protrudes outward in a vehicle width direction with respect to a swing axis of the suspension arm,
the suspension arm further includes an arm end which swingably supports the vehicle body about the swing axis, and
the arm end is located higher than the winch.

14. The suspension of claim 1, wherein:
a stabilizer is attached to the suspension arm, and
the curve is positioned closer to the vehicle body frame in the longitudinal direction than a portion of the suspension arm to which the stabilizer is attached is.

15. The suspension of claim 1, wherein:
the suspension arm includes a front arm, a rear arm located at a rear with respect to the front arm and a cross member that couples the front arm and the rear arm, and
the curve is positioned closer to the vehicle body frame in the longitudinal direction than the cross member is.

16. The suspension of claim 1, wherein:
the curve of the suspension arm swingably supports the vehicle body about a swing axis, and
an end of the suspension arm at the vehicle body frame is more forward on the vehicle body than an end closer to the vehicle body frame of a steering tie rod.

17. An off-road vehicle comprising:
a vehicle body frame;
a front wheel;
a knuckle that supports the front wheel;
a suspension that couples the knuckle to the vehicle body frame, the suspension including a suspension arm that couples the knuckle to the vehicle body frame and swings relative to the vehicle body frame; and
a shock absorber attached to the suspension arm,
wherein:
the suspension arm has a curve which curves in an upwardly raised shape to avoid contact with another component,
the another component is on an inside of the curve, and
the suspension arm is coupled to the vehicle body frame at the curve,
wherein the suspension arm extends downward diagonally at all portions thereof from the vehicle body frame to the knuckle.

* * * * *